(12) United States Patent
Osaka

(10) Patent No.: US 7,426,595 B2
(45) Date of Patent: Sep. 16, 2008

(54) DESKTOP HOLDER AND PORTABLE TERMINAL SYSTEM

(75) Inventor: Masahiko Osaka, Saitama (JP)

(73) Assignee: NEC Corporation, Tokyo (JP)

( * ) Notice: Subject to any disclaimer, the term of this patent is extended or adjusted under 35 U.S.C. 154(b) by 336 days.

(21) Appl. No.: 11/073,997

(22) Filed: Mar. 8, 2005

(65) Prior Publication Data

US 2005/0201049 A1 Sep. 15, 2005

(30) Foreign Application Priority Data

Mar. 9, 2004 (JP) ............................. 2004-065306

(51) Int. Cl.
- G06F 13/00 (2006.01)
- H04B 1/38 (2006.01)
- H04M 3/00 (2006.01)
- G06F 12/00 (2006.01)

(52) U.S. Cl. ...................... 710/304; 455/557; 455/419; 710/301; 710/300; 707/204; 379/355.02; 379/419

(58) Field of Classification Search ......... 361/679–686; 707/200–204; 455/557

See application file for complete search history.

(56) References Cited

U.S. PATENT DOCUMENTS

| | | | |
|---|---|---|---|
| 5,566,226 A | | 10/1996 | Mizoguchi et al. |
| 5,859,628 A | * | 1/1999 | Ross et al. .................. 345/173 |
| 6,252,791 B1 | * | 6/2001 | Wallace et al. ................. 365/52 |
| 6,434,034 B1 | * | 8/2002 | Wallace et al. ................. 365/52 |
| 6,754,756 B2 | * | 6/2004 | Chien et al. .................. 710/300 |
| 6,757,698 B2 | * | 6/2004 | McBride et al. ............. 707/204 |
| 6,779,724 B1 | * | 8/2004 | Yamada ....................... 235/451 |
| 6,832,281 B2 | * | 12/2004 | Jones et al. .................. 710/301 |
| 6,862,591 B2 | * | 3/2005 | Majewski et al. ............... 707/3 |
| 7,042,950 B2 | * | 5/2006 | Yamana et al. ......... 375/240.29 |
| 7,054,594 B2 | * | 5/2006 | Bloch et al. ................. 455/41.2 |
| 7,054,624 B2 | * | 5/2006 | Cocita ........................ 455/419 |
| 7,152,783 B2 | * | 12/2006 | Charrin ...................... 235/379 |
| 2002/0087588 A1 | * | 7/2002 | McBride et al. ............. 707/204 |
| 2002/0111190 A1 | * | 8/2002 | Harrison et al. ............. 455/557 |

(Continued)

FOREIGN PATENT DOCUMENTS

JP 10-334172 12/1998

(Continued)

OTHER PUBLICATIONS

Patent Abstracts of Japan, vol. 2003, No. 10, Oct. 8, 2003, abstract.

(Continued)

*Primary Examiner*—Mark Rinehart
*Assistant Examiner*—Brian Misiura
(74) *Attorney, Agent, or Firm*—Foley & Lardner LLP

(57) ABSTRACT

A desktop holder includes a connector to be connected to a connector of a portable terminal inserted into an insertion inlet, a connector to be connected to a memory card inserted into a memory card slot, a cable which connects connectors, and a connector which connects an AC adaptor, thereby enabling a battery pack to be charged by the supply of charging DC voltage supplied from the AC adaptor to the portable terminal, as well as enabling the portable terminal to read and write from/to the memory card by key operation of the portable terminal.

7 Claims, 8 Drawing Sheets

U.S. PATENT DOCUMENTS

| | | | |
|---|---|---|---|
| 2004/0131173 A1* | 7/2004 | Janssen et al. | 379/355.02 |
| 2004/0212831 A1* | 10/2004 | Imai et al. | 358/1.16 |
| 2004/0234071 A1* | 11/2004 | Bae et al. | 379/419 |
| 2005/0208967 A1* | 9/2005 | Buniatyan | 455/557 |

FOREIGN PATENT DOCUMENTS

| | | |
|---|---|---|
| JP | 11-242653 | 9/1999 |
| JP | 2000-216914 A | 8/2000 |
| JP | U3072497 | 8/2000 |
| JP | 2000-324237 A | 11/2000 |
| JP | 2001-142614 A | 5/2001 |
| JP | 2001-202292 A | 7/2001 |
| JP | 2002-152401 A | 5/2002 |
| JP | 2002-215275 A | 7/2002 |
| JP | 2003-044796 A | 2/2003 |
| JP | 2003-169156 | 6/2003 |
| JP | 2003258991 A * | 9/2003 |
| JP | 2003-283610 | 10/2003 |
| JP | 2003-283610 A | 10/2003 |
| JP | 2005011148 A * | 1/2005 |
| JP | 2005229454 A * | 8/2005 |
| KR | 2001056467 A * | 7/2002 |
| WO | WO 03/005690 | 1/2003 |
| WO | WO 03/005690 A1 | 1/2003 |

OTHER PUBLICATIONS

Patent Abstracts of Japan, vol. 2003, No. 12, Dec. 5, 2003, abstract.

* cited by examiner

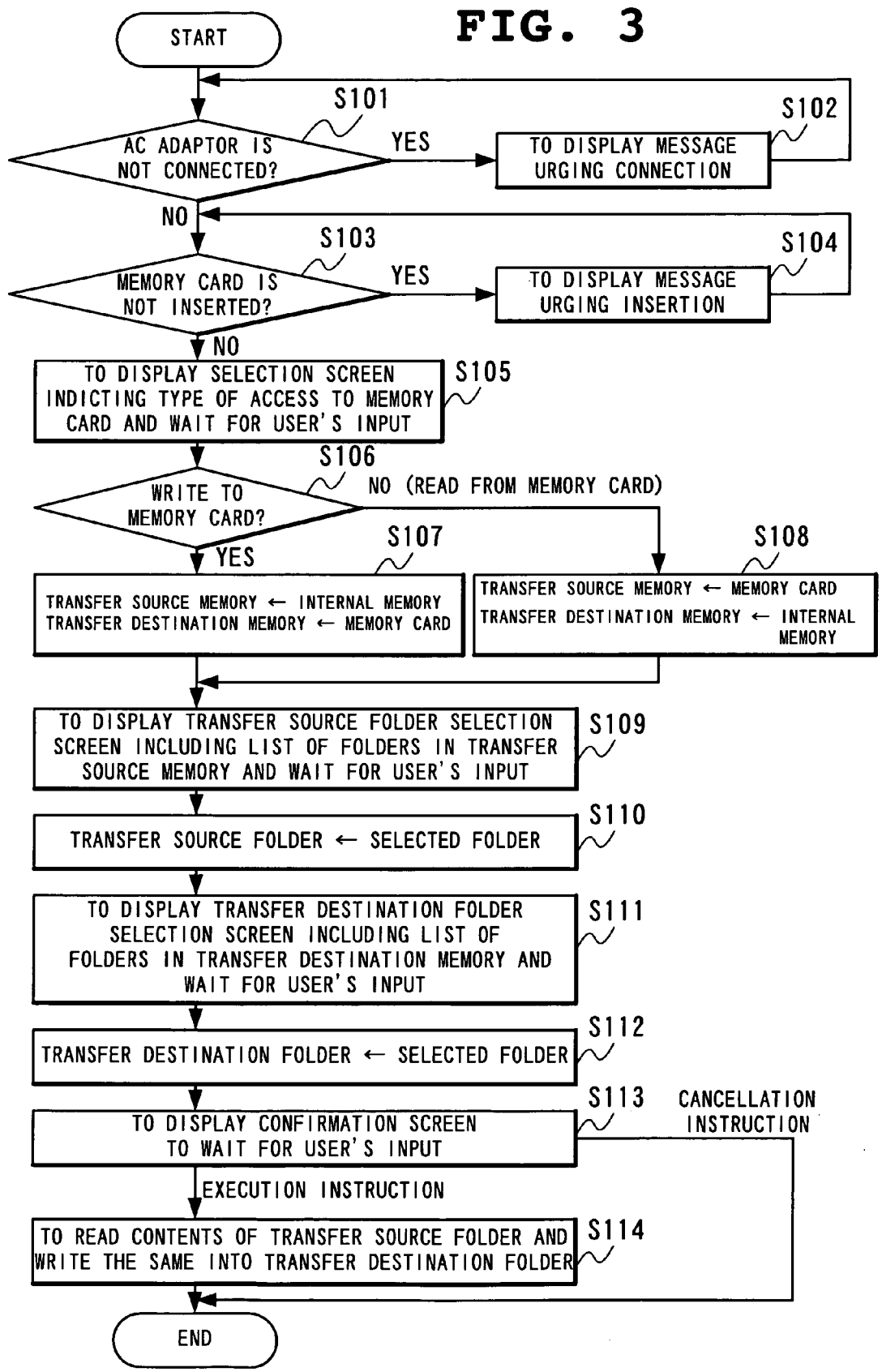

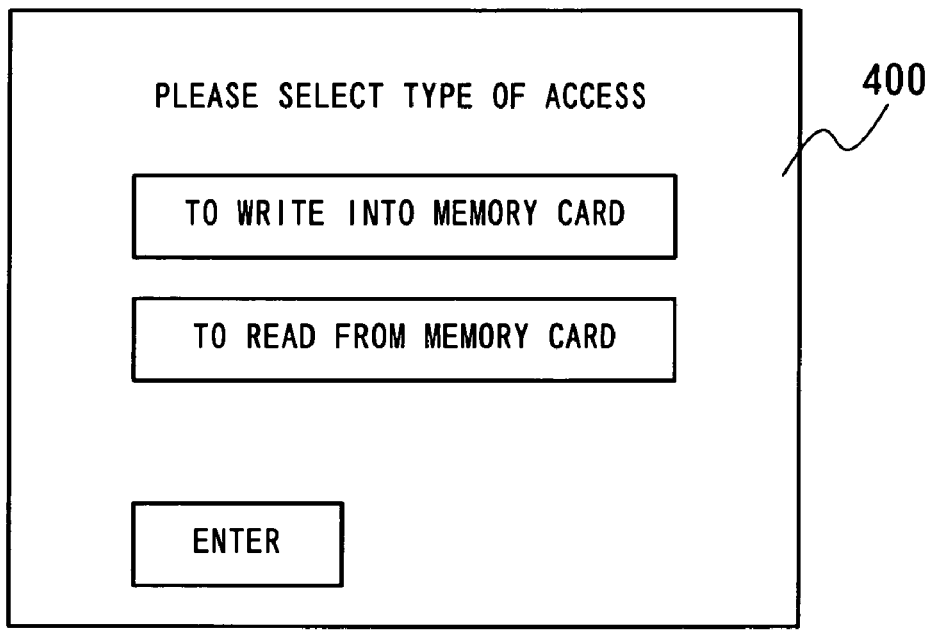
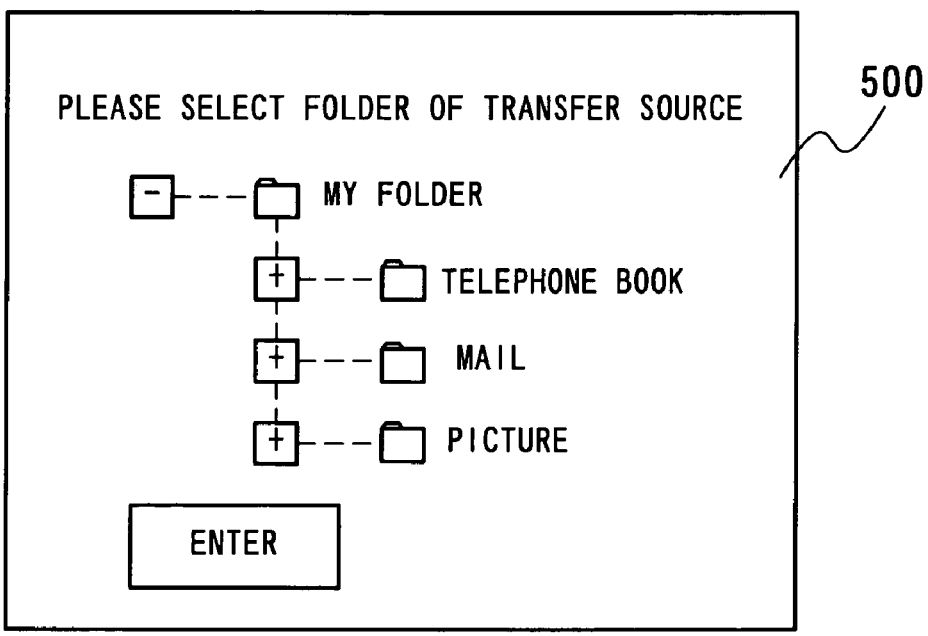

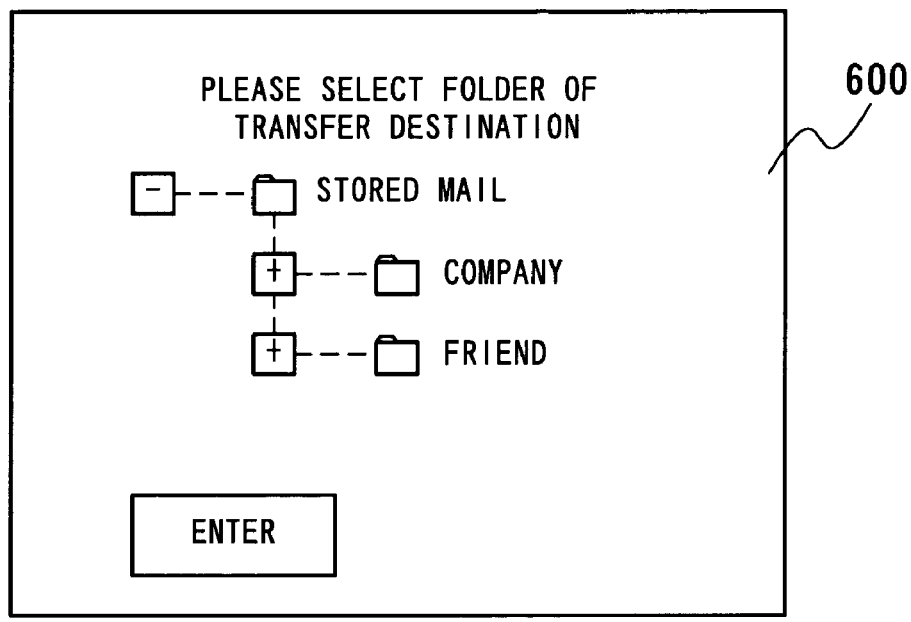
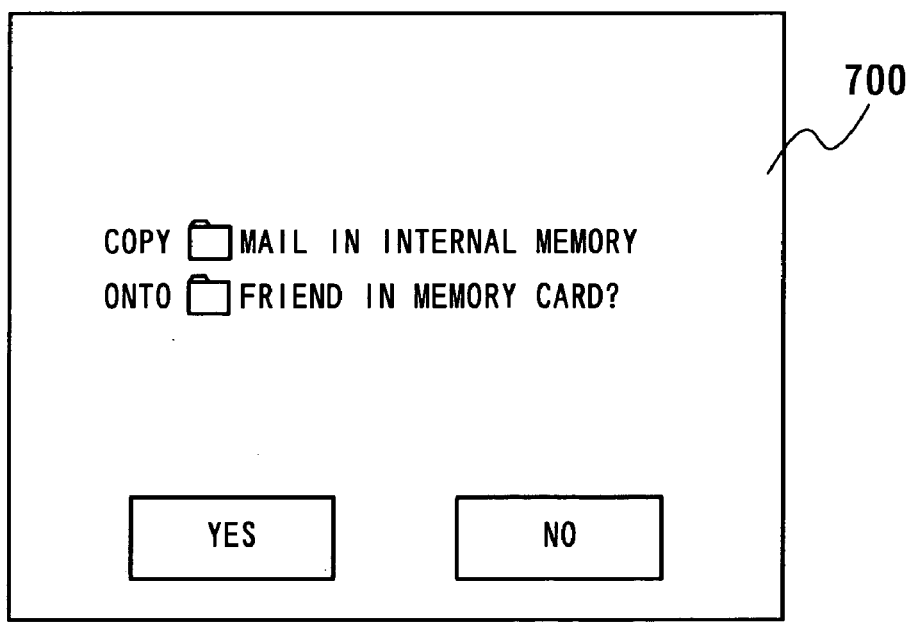

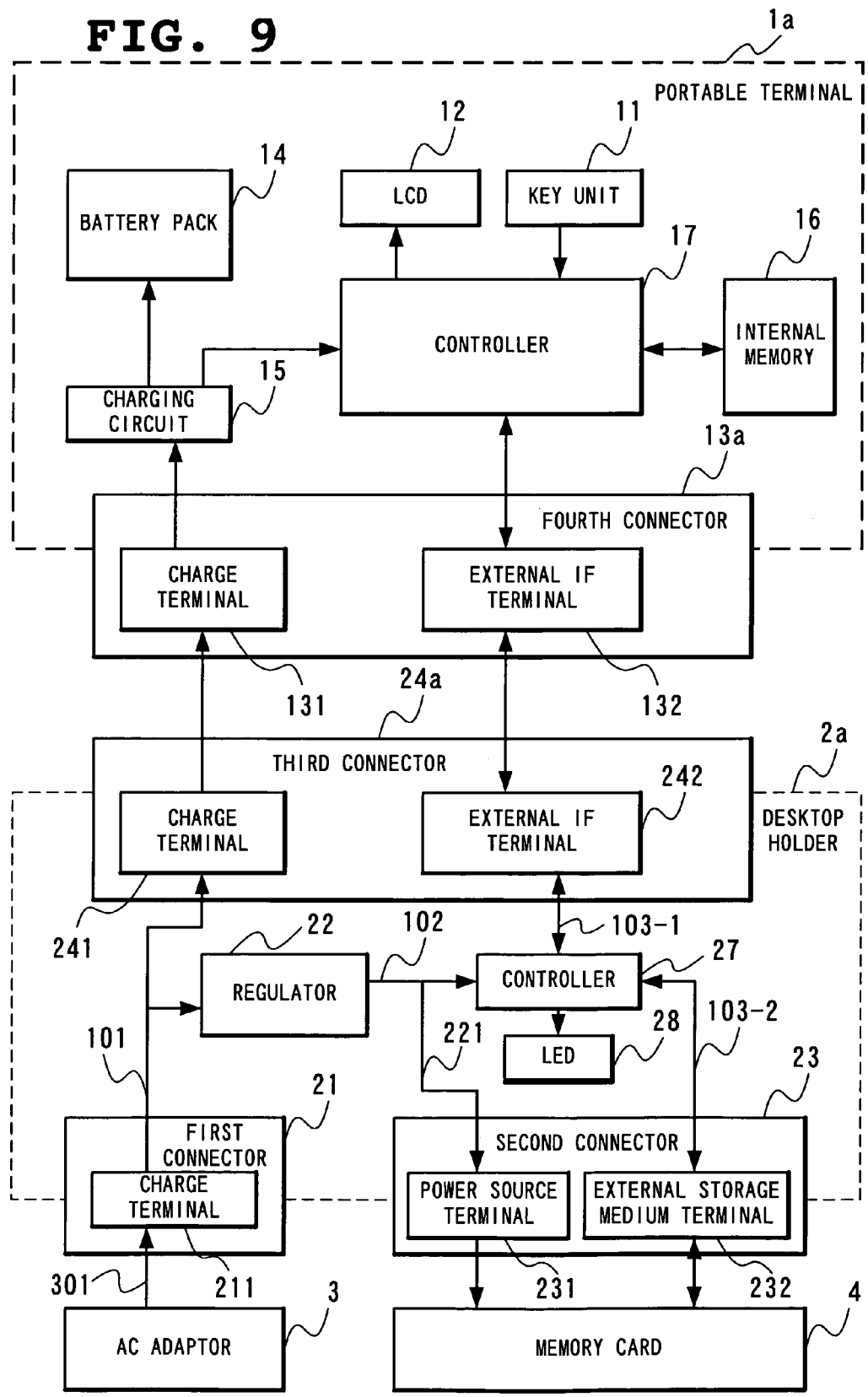

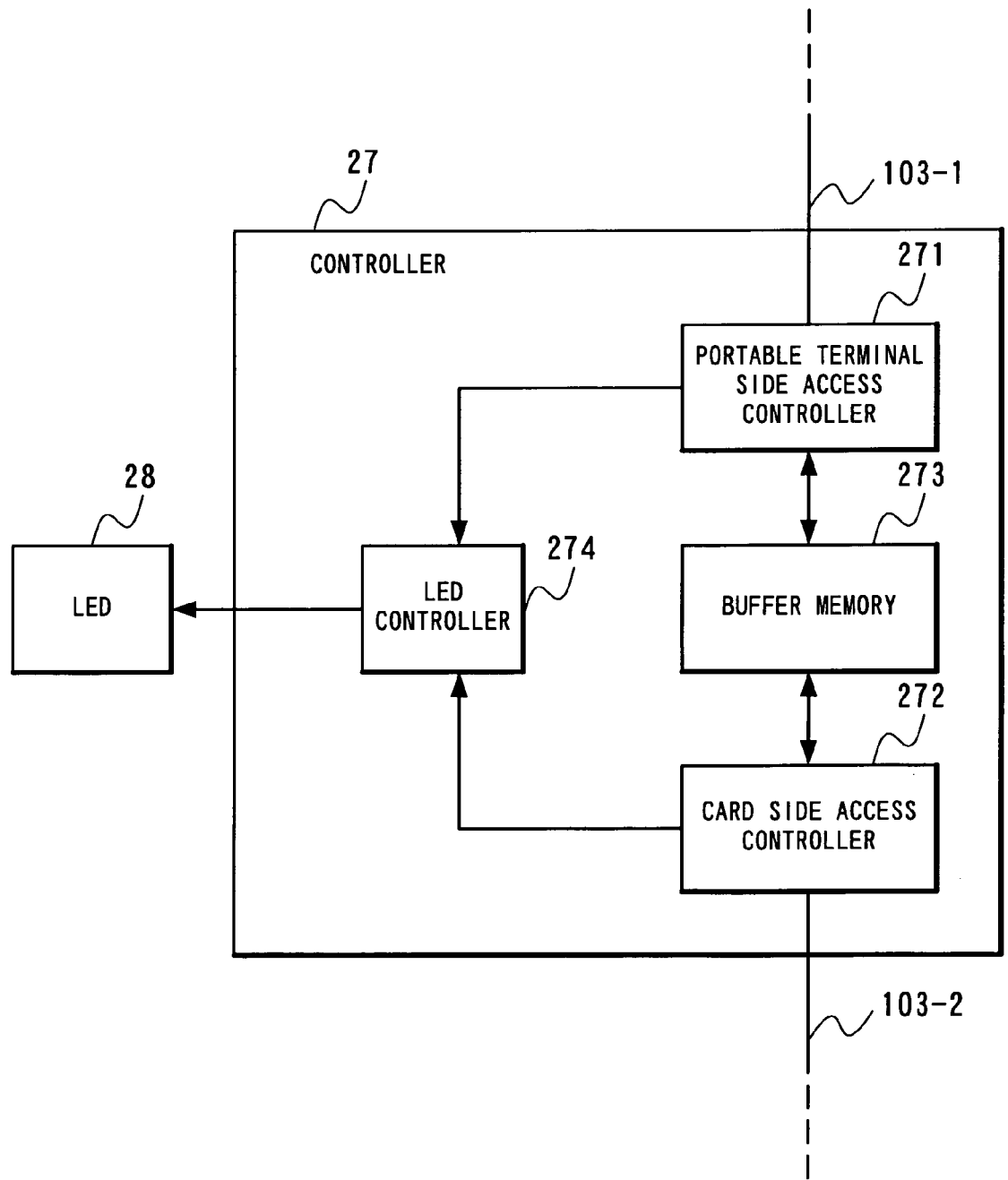

DESKTOP HOLDER AND PORTABLE TERMINAL SYSTEM

BACKGROUNDS OF THE INVENTION

1. Field of the Invention

The present invention relates to a desktop holder of a portable terminal, and more particularly, to a desktop holder having a function of charging a battery pack built in the portable terminal and an external memory function.

2. Description of the Related Art

A portable terminal represented by a cellular phone has to be charged regularly in order to operate with a battery pack as its power source. A desktop holder for a portable terminal having a function of charging the battery pack is sold in sets with a portable terminal or sold separately.

Portable terminal units require high value-added quality and high functionality to inevitably invite an increase in memory capacity. For increasing the memory capacity, there are a method of increasing the capacity of an internal memory and a method of using an external memory. In a case of a portable terminal which requires reduction in size and weight, expansion of the capacity of the internal memory is restricted. Therefore, installation of a memory card, as an external memory, which is detachable from a main body is becoming the mainstream in this field. A memory card is a card-type storage device using a flash memory whose representative is an MMC (multi media card), an SD memory card, or a memory stick.

Japanese Patent Laid-Open (Kokai) No. 2003-283610 (hereinafter, referred to as Article 1) discloses a battery charge adaptor having a function of charging a battery pack built in a cellular phone and an external memory function. The battery charge adaptor disclosed in Article 1 includes an adaptor having a plug to be inserted into a socket of a commercial power source and a light emitting element, a connector to be connected to an external connection terminal of the cellular phone, and a connecting means which electrically connects the adaptor and the connector.

The adaptor includes an AC/DC converter which converts AC voltage from the commercial power source into DC voltage for charge and supplies the obtained voltage to the cellular phone through the connector and the connecting means to charge the battery pack, a charge monitoring means which monitors whether charge of the battery pack has been completed or not, a storage means as an external storage, and a control means which transfers storage data including at least data of a telephone book from an internal memory of the cellular phone to make the storage means store it upon detecting the completion of the charge by the charge monitoring means, and notifies the data transferring state by the light emitting element.

Also described are a structure which enables a switch provided on a battery charge adaptor to set whether or not data should be transferred from the internal memory of the cellular phone to the storage means at the time of completion of battery charge and a structure which enables, at completion of battery charge, setting which one to perform, of the data transfer from the internal memory of the cellular phone to the storage means and the inverse data transfer from the storage means to the internal memory or setting to perform none of them.

According to the battery charge adaptor recited in Article 1, the storage data including the telephone book data stored in the internal memory of the cellular phone can be automatically stored in the storage means built in the battery charge adaptor at the completion of battery charge of the battery pack of the cellular phone and conversely, the storage data held in the battery charge adaptor can be automatically transferred to the internal memory of the cellular phone.

The storage means built in the battery charge adaptor, however, is not detachable and cannot transfer data to other units than the cellular phone. Therefore, the data stored in the external memory cannot be used in a personal computer and other kinds of portable terminals, that is, the data cannot be shared.

Furthermore, it is impossible to perform, for example, such access control of storing in the external memory only the data selected by a user among the data stored in the internal memory according to key operation. Though a memory card attachable portable terminal could solve the problem, it would require enough space to install a memory card in the portable terminal, which prevents downsizing and weight-saving to invite as much increase in power consumption of the portable terminal as the amount of the power consumption of the memory card.

SUMMARY OF THE INVENTION

Taking the above-described situation into consideration, an object of the present invention is to provide a desktop holder and a portable terminal system which have a function of charging a battery pack and an external memory function and which enable a detachable memory card as an external memory to be used and access to the memory card to be controlled according to key operation of the portable terminal.

According to one aspect of the invention, a desktop holder which accommodates a portable terminal, comprises a connector which electrically connects an external storage medium inserted into an external storage medium slot and an external connection terminal of the accommodated portable terminal to enable read and write from/to the external storage medium by operation of the portable terminal, and a connector which supplies charging DC voltage supplied from an AC adaptor to the portable terminal to charge a battery.

In the preferred construction, the desktop holder includes, as contained in a case, a first connector having a charge terminal to be connected to an output terminal of the AC adaptor which converts AC voltage of a commercial power source into charging DC voltage and outputs the obtained voltage, a second connector having an external storage medium terminal to be connected to the external storage medium, and a third connector having a charge terminal to be connected to the external connection terminal of the portable terminal and connected to the charge terminal of the first connector and a terminal connected to the external storage medium terminal of the second connector.

In another preferred construction, the second connector is provided in the external storage medium slot provided in the case, and the third connector is provided in a portable terminal insertion inlet provided in the case.

In another preferred construction, the desktop holder further comprises a regulator which receives input of the charging DC voltage from the charge terminal of the first connector and converts the voltage into operating voltage to output the obtained voltage, wherein the second connector includes a power source terminal to which output of the regulator is applied.

In another preferred construction, the desktop holder is internally provided with a first connector having a charge terminal to be connected to an output terminal of an AC adaptor which converts AC voltage of a commercial power source into charging DC voltage and outputs the obtained voltage, a second connector having an external storage medium terminal to be connected to an external storage medium inserted into an external storage medium slot, and a third connector having a charge terminal to be connected to an external connection terminal of the portable terminal and connected to the charge terminal of the first connector and an external storage medium terminal connected to the external storage medium terminal of the second connector, and the portable terminal includes a fourth connector having a charge terminal and an external storage medium terminal to be electrically and physically connected to the third connector, a charging circuit which receives input of the charging DC voltage from the charge terminal of the fourth connector to charge a battery, and control means which controls read and write from/to the external storage medium inserted into the external storage medium slot of the desktop holder to be connected through the external storage medium terminal of the fourth connector.

In another preferred construction, the second connector is provided in the external storage medium slot provided in the case of the desktop holder, and the third connector is provided in a portable terminal insertion inlet provided in the case of the desktop holder.

In another preferred construction, the portable terminal system further comprises a regulator which receives input of the charging DC voltage from the charge terminal of the first connector and converts the voltage into operating voltage to output the obtained voltage, wherein the second connector includes a power source terminal to which output of the regulator is applied.

In another preferred construction, the control means of the portable terminal, with either one of an internal memory of the portable terminal and the external storage medium inserted into the external storage medium slot set to be a transfer source memory and the other set to be a transfer destination memory, displays a list of folders of the transfer source memory on a display device of the portable terminal to select a transfer source folder by key operation and displays a list of folders of the transfer destination memory on the display device to make a user select a transfer destination folder by key operation, thereby reading data stored in the selected transfer source folder and writing the data into the selected transfer destination folder.

According to another aspect of the invention, in a portable terminal system having a portable terminal and a desktop holder for the portable terminal, the desktop holder is internally provided with a first connector having a charge terminal to be connected to an output terminal of an AC adaptor which converts AC voltage of a commercial power source into charging DC voltage and outputs the obtained voltage, a second connector having an external storage medium terminal to be connected to an external storage medium inserted into an external storage medium slot, a third connector having a charge terminal connected to the charge terminal of the first connector and an external interface terminal connected to the external storage medium terminal of the second connector, and control means having an interface conversion function of connecting the external storage medium terminal of the second connector and the external interface terminal, and the portable terminal includes a fourth connector having a charge terminal and an external interface terminal to be electrically and physically connected to the third connector, a charging circuit which receives input of the charging DC voltage from the charge terminal of the fourth connector to charge a battery, and control means which controls read and write from/to the external storage medium inserted into the external storage medium slot of the desktop holder to be connected through the external storage medium terminal of the fourth connector.

In the preferred construction, the second connector is provided in the external storage medium slot provided in the case of the desktop holder, and the third connector is provided in a portable terminal insertion inlet provided in the case of the desktop holder.

In another preferred construction, the portable terminal system further comprises a regulator which receives input of the charging DC voltage from the charge terminal of the first connector and converts the voltage into operating voltage to output the obtained voltage, wherein the second connector includes a power source terminal to which output of the regulator is applied.

In another preferred construction, the control means of the desktop holder includes a portable terminal side access controller, a card side access controller and a buffer memory, and wherein the portable terminal side access controller sends and receives data and a control signal to/from the control means of the portable terminal through the external interface terminal of the third connector by a procedure according to the external interface and at the time of write to the external storage medium, accumulates, in the buffer memory, data of an internal memory of the portable terminal received from the control means of the portable terminal, and at the time of read from the external storage medium, transfers the data of the external storage medium accumulated in the buffer memory to the control means of the portable terminal, and the card side access controller sends and receives data and a control signal to/from the external storage medium through the external storage medium terminal of the second connector by a procedure according to the external storage medium interface and at the time of write to the external storage medium, writes data of the internal memory accumulated in the buffer memory into the external storage medium and at the time of read from the external storage medium, accumulates, in the buffer memory, data read from the external storage medium.

In another preferred construction, the control means of the portable terminal, with either one of an internal memory of the portable terminal and the external storage medium inserted into the external storage medium slot set to be a transfer source memory and the other set to be a transfer destination memory, displays a list of folders of the transfer source memory on a display device of the portable terminal to select a transfer source folder by key operation and displays a list of folders of the transfer destination memory on the display device to make a user select a transfer destination folder by key operation, thereby reading data stored in the selected transfer source folder and writing the data into the selected transfer destination folder.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a flow chart showing an example of processing of a controller of the portable terminal according to the first embodiment of the present invention;

FIG. 4 is a view showing one example of a selection screen of access type displayed on an LCD of the portable terminal according to the first embodiment of the present invention;

FIG. 5 is a view showing one example of a selection screen of a transfer source folder displayed on the LCD of the portable terminal according to the first embodiment of the present invention;

FIG. 6 is a view showing one example of a selection screen of a transfer destination folder displayed on the LCD of the portable terminal according to the first embodiment of the present invention;

FIG. 7 is a view showing one example of a confirmation screen displayed on the LCD of the portable terminal according to the first embodiment of the present invention;

FIG. 9 is a block diagram of the portable terminal and the desktop holder according to the second embodiment of the present invention; and FIG. 10 is a block diagram showing an example of a structure of a controller of the desktop holder according to the second embodiment of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
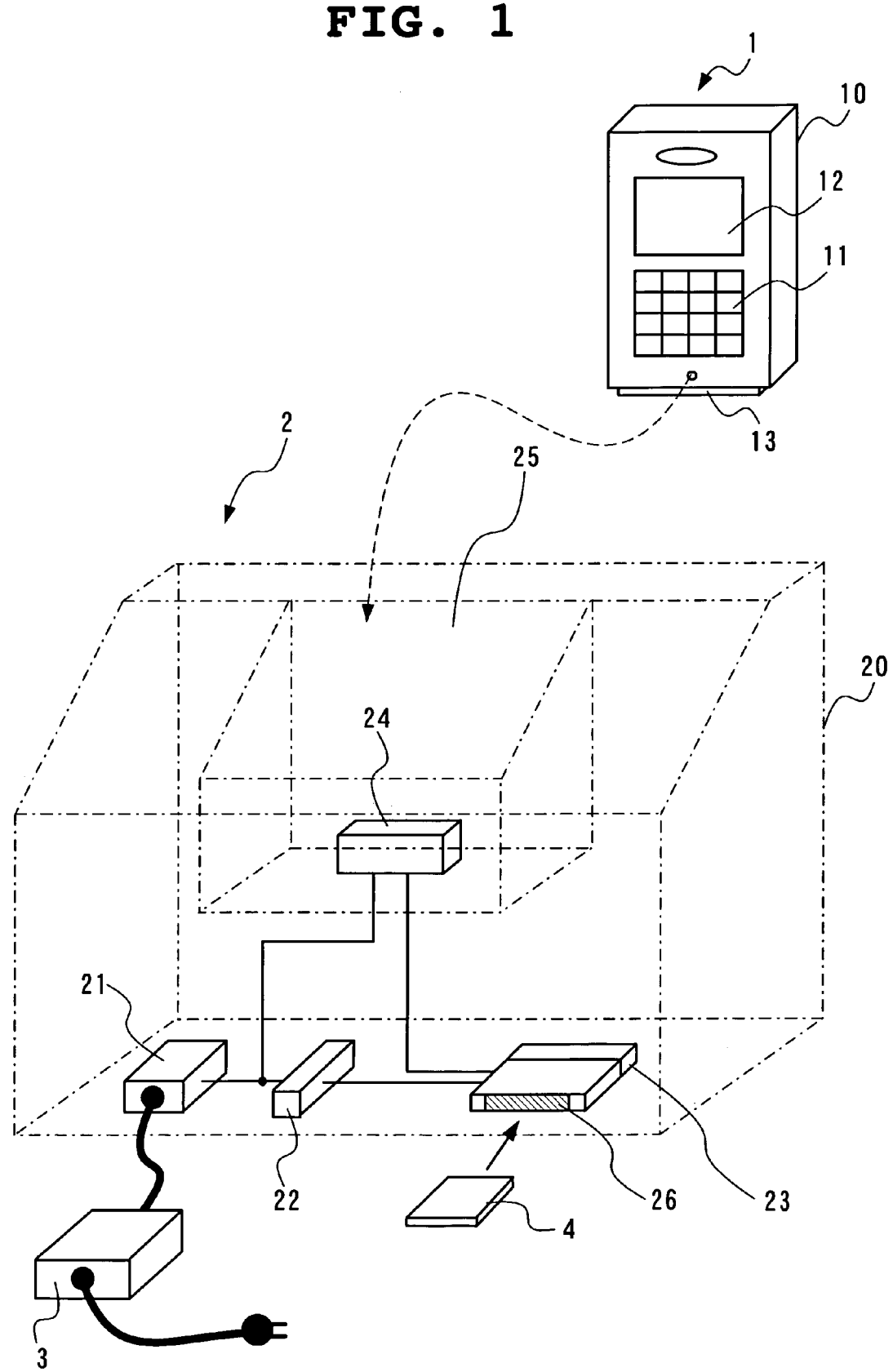
FIG. 1 is a view schematically showing a structure of a portable terminal and a desktop holder according to a first embodiment of the present invention.
Figure 2:
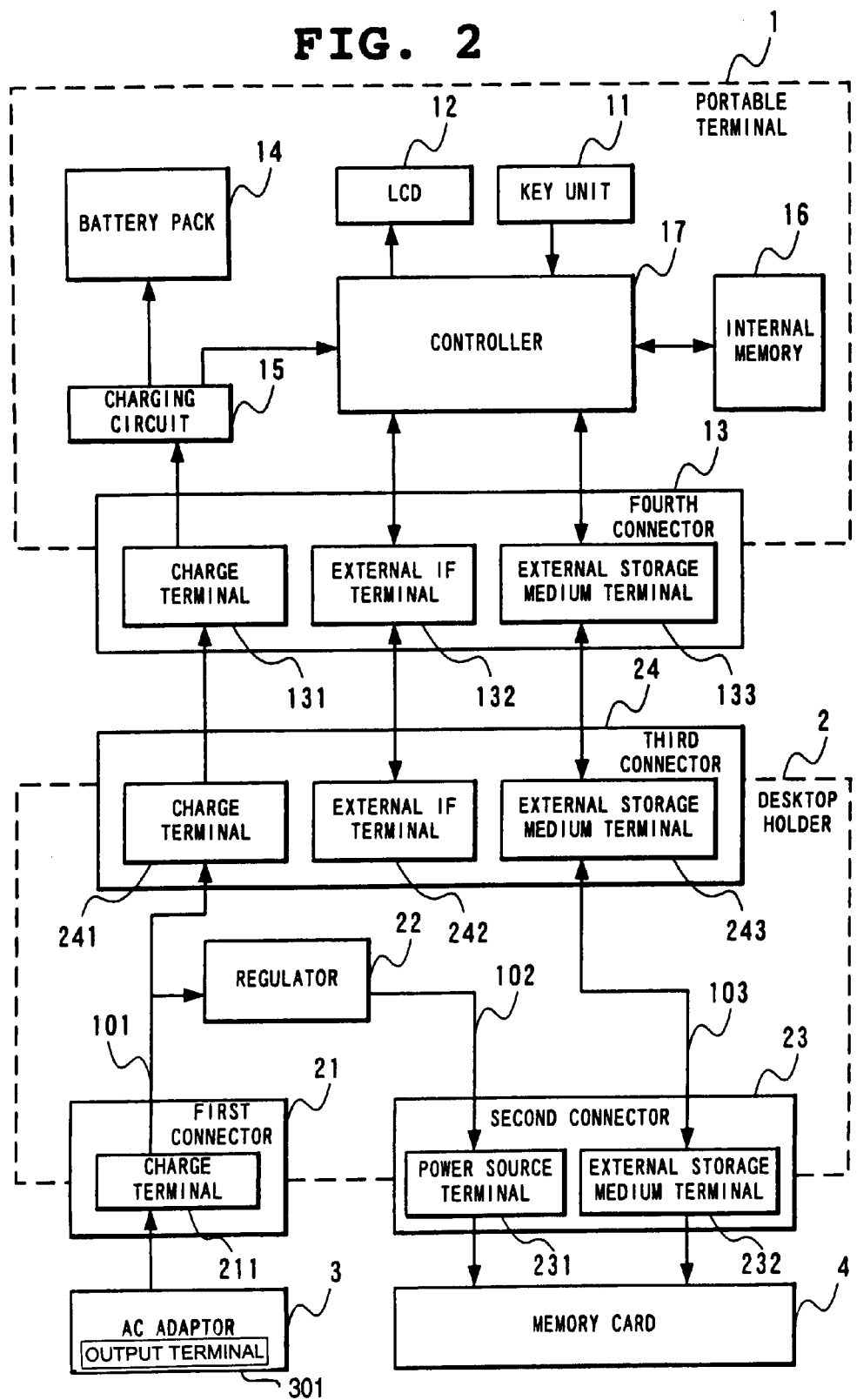
FIG. 2 is a block diagram of the portable terminal and the desktop holder according to the first embodiment of the present invention.

Referring to FIG. 1 and FIG. 2, a desktop holder 2 for a portable terminal 1 according to a first embodiment of the present invention includes, within a case 20, a first connector 21 having a charge terminal 211 connected to an output terminal 301 of an AC adaptor 3 which converts AC voltage of a commercial power source into charging DC voltage of about 5V and outputs the obtained voltage, a regulator 22 which receives the charging DC voltage from the charge terminal 211 of the first connector 21 through a cable 101, converts it into operating voltage of about 3V and supplies the obtained voltage through a cable 102, a second connector 23 having a power source terminal 231 to which the output of the regulator 22 is applied through the cable 102 and an external storage medium terminal 232, and a third connector 24 having a charge terminal 241 which is connected to the charge terminal 211 of the first connector 21 through the cable 101, an external interface terminal 242 and an external storage medium terminal 243 which is connected to the external storage medium terminal 232 of the second connector 23 through a cable 103.

The case 20 has an insertion inlet 25 for the portable terminal 1 on its top surface and a slot 26 for a memory card 4 on its side surface. The second connector 23 is attached to the back of the memory card slot 26 and the third connector 24 is attached to the bottom surface of the insertion inlet 25.

The upper portion of the case 20 is cut off slantwise such that when the portable terminal 1 is inserted into the insertion inlet 25 with its front side facing a user's view, its key unit 11 and LCD 12 are completely exposed to the user.

On the other hand, the portable terminal 1 includes, within a case 10, a fourth connector 13 having a charge terminal 131, an external interface terminal 132 and an external storage medium terminal 133 which is electrically and physically connected to the third connector 24 at a state where the terminal is inserted into the insertion inlet 25 of the desktop holder 2, a battery pack 14, a charging circuit 15 which receives the charging DC voltage from the charge terminal 131 of the fourth connector 13 to charge the battery pack 14, an internal memory 16, the LCD 12, the key unit 11 having various kinds of keys, and a controller 17 which is connected to the external interface terminal 132 and the external storage medium terminal 133 of the fourth connector 13, the internal memory 16, the LCD 12 and the key unit 11.

The controller 17, which is designed to include an MPU, controls the whole of the portable terminal 1. As for the present invention, it has, in particular, a function of controlling reading and writing from/to the memory card 4 according to user's input through the key unit 11.

In a case, for example, where an MMC (multi media card) is used as the memory card 4, the external storage medium terminals 232, 243 and 133 of the second, the third, and the fourth connectors 23, 24 and 13 are formed by a terminal group for MMC. When other kind of memory card 4 such as an SD memory card or a memory stick is used, they are similarly formed by a terminal group of 10 cores suitable for a memory card of a kind to be used.

When the fourth connector 13 is connected to the third connector 24 of the desktop holder 2, the external storage medium terminal 133 of the portable terminal 1 is electrically connected to the external storage medium terminal 232 of the second connector 23 through the external storage medium terminal 243 of the third connector 24 and the cable 103. When the memory card 4 is inserted into the memory card slot 26 to make an external connection terminal, not illustrated, of the memory card 4 be connected to the external storage medium terminal 232 of the second connector 23, ultimate connection with the external storage medium terminal 133 of the portable terminal 1 enables the portable terminal 1 to make direct access to the memory card 4.

When the output terminal 301 of the AC adaptor 3 connected to the commercial power source is connected to the first connector 21 of the desktop holder 2, charging DC voltage is applied to the regulator 22 and the charge terminal 241 of the third connector 24 through the cable 101. As a result, the charging DC voltage is supplied to the charging circuit 15 through the charge terminal 131 of the fourth connector 13 to enable the charging circuit 15 to charge the battery pack 14. The operating voltage generated by the regulator 22 is supplied to the memory card 4 through the cable 102 and the power source terminal 231 of the second connector 23 to enable operation of the memory card 4.

The operation conducted when accessing the memory card 4 inserted into the slot 26 of the desktop holder 2 from the portable terminal 1 will be described in detail.

When a user copies the data stored in the internal memory 16 of the portable terminal 1 onto the memory card 4 or conversely when copying the data stored in the memory card 4 onto the internal memory 16, he/she inserts the portable terminal 1 into the insertion inlet 25 of the desktop holder 2 to connect the fourth connector 13 to the third connector 24. Then, the user inputs an instruction to start access of the memory card 4 through the key unit 11.

The controller 17 starts the processing whose contents are shown in FIG. 3 upon receipt of the instruction input through the key unit 11.

The controller 17 checks whether the AC adaptor 3 connected to the commercial power source is connected to the desktop holder 2 (Step S101).

As mentioned above, when the AC adaptor 3 is connected to the desktop holder 2, the charging DC voltage is applied to the charging circuit 15 through the first connector 21, the cable 101, the third connector 24 and the fourth connector 13. The charging circuit 15 accordingly notifies the controller 17 of a signal indicating whether the charging DC voltage is applied or not, thereby enabling the controller 17 to check the connection of the AC adaptor 3 to the desktop holder 2.

When the AC adaptor 3 is not connected, the controller displays a message urging a user to connect the AC adaptor 3 on the LCD 12 (Step S102). The structure on which this message is not displayed is also possible.

Upon confirming that the AC adaptor 3 is connected to the desktop holder 2, the controller 17 further checks whether the memory card 4 is inserted into the slot 26 (Step S103).

As mentioned above, when the external connection terminal, not illustrated, of the memory card 4 is connected to the second connector 23 of the slot 26, the operating voltage supplied from the regulator 22 through the cable 102 is supplied to the memory card 4 through the power source terminal 231 to enable the operation of the memory card 4. As a result, accessing the memory card 4 through the fourth connector 13, the third connector 24, the cable 103 and the second connector 23 enables the controller 17 to check whether the memory card 4 is inserted into the slot 26.

When the memory card 4 is not inserted therein, a message urging a user to insert the memory card is displayed on the LCD 12 (Step S104). Because when the AC adaptor 3 is not connected or when the memory card 4 is not inserted, an error can occur at the time of reading or writing of the memory card 4, a message urging a user to connect the AC adaptor 3 or insert the memory card 4 may be displayed on the LCD 12 at the time of occurrence of the error.

When the controller 17 confirms the insertion of the memory card 4, it then displays a selection screen 400 indicting types of access (write or read) to the memory card 4 on the LCD 12 and waits for user's input (Step S105).

FIG. 4 shows one example of the selection screen 400 indicating the access type which is displayed on the LCD 12. A user can select "write into the memory card" or "read from the memory card" displayed on the selection screen 400 by using a cursor key on the key unit 11 and press the enter button to select an access type.

When "write into the memory card" is selected on the access type selection screen 400 (YES in Step S106), the controller 17 sets the internal memory 16 as a transfer source memory and the memory card 4 as a transfer destination memory (Step S107).

When "read from the memory card" is selected (NO in Step S106), set the memory card 4 as a transfer source memory and the internal memory 16 as a transfer destination memory (Step S108).

The controller 17 gains access to the transfer source memory to ask for a list of the folders existing in the transfer source memory and displays a transfer source folder selection screen 500 including the list on the LCD 12 to wait for user's input (Step S109).

FIG. 5 shows one example of the transfer source folder selection screen 500 displayed on the LCD 12. This example shows the case where the transfer source memory is the internal memory 16, indicating that there are a folder named "my folder" and three sub-folders named "telephone book", "mail", and "picture" in its lower level. A user can select one of the folders with a cursor key on the key unit 11 or the like and press the enter button to select a transfer source folder.

When the folder is selected on the transfer source folder selection screen 500, the controller 17 sets the selected folder as the transfer source folder (Step S110).

Next, the controller 17 gains access to the transfer destination memory to ask for a list of the folders existing in the transfer destination memory and displays a transfer destination folder selection screen 600 including the list on the LCD 12 to wait for user's input (Step S111).

FIG. 6 shows one example of the transfer destination folder selection screen 600 displayed on the LCD 12. This example shows the case where the transfer destination memory is the memory card, indicating that there are a folder named "stored mail" and two sub-folders named "company" and "friend" in its lower level. A user can select one of the folders with a cursor key on the key unit 11 and press the enter button to select a transfer destination folder.

When the folder is selected on the transfer destination folder selection screen 600, the controller 17 moves to a state where the selected folder is set as the transfer destination folder (Step S112).

Next, the controller 17 displays a confirmation screen 700 which makes a user confirm the selected transfer source folder and transfer destination folder on the LCD 12 to wait for user's input (Step S113).

FIG. 7 shows one example of the confirmation screen 700 displayed on the LCD 12. This example shows the case where the access type is "write into the memory card" and selected as a transfer source folder is the "mail" folder of the internal memory 16 and selected as a transfer destination folder is the "friend" folder of the memory card 4. A user can press "YES" button or "NO" button displayed to instruct whether to execute this operation.

When the "NO" button is pressed on the confirmation screen 700, the processing of FIG. 3 is finished.

On the other hand, when the "YES" button is pressed, the contents of the transfer source folder are read from the transfer source memory and written into the transfer destination folder of the transfer destination memory (Step S114). During the data transfer from the transfer source memory to the transfer destination memory, the controller 17 displays a message to this effect on the screen of the LCD 12 and when the data transfer is completed, a message to this effect is displayed.

According to the present embodiment, the following effects can be obtained.

Since access to the memory card 4 inserted in the memory card slot 26 provided in the desktop holder 2 can be made from the portable terminal 1 to eliminate the need of the memory card slot of the portable terminal 1, a further reduction of the portable terminal 1 can be realized in size and weight.

Access to the memory card 4 can be controlled by key operation of the key unit 11 of the portable terminal.

Since the power source of the memory card 4 is not the portable terminal 1 but the AC adaptor 3, an increase in the power consumption of the portable terminal 1 can be prevented. In addition, since data can be read and written from/to the memory card 4 while charging the battery pack 14, such a problem as data destruction can be prevented which is caused by power shut-off due to a dead battery during access to the memory card 4.

Next, a desktop holder for a portable terminal according to a second embodiment of the present invention will be described.

Figure 8:
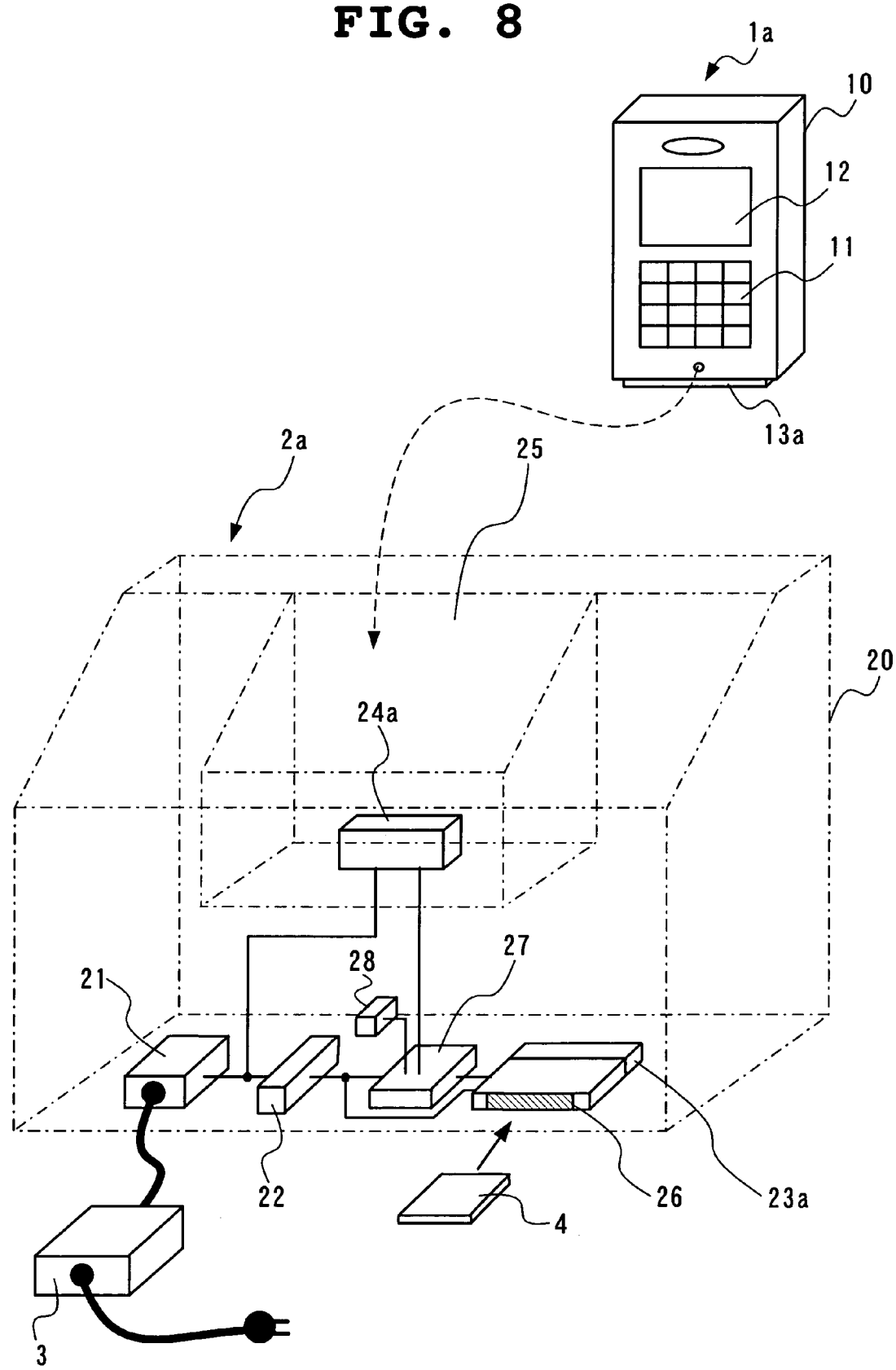
FIG. 8 is a view schematically showing a structure of a portable terminal and a desktop holder according to a second embodiment of the present invention.

With reference to FIG. 8 and FIG. 9, a desktop holder 2a for a portable terminal 1a according to the second embodiment of the present invention is different in the following points from the desktop holder 2 according to the first embodiment shown in FIG. 1.

(1) A third connector 24a has the charge terminal 241 and the external interface terminal 242 and not an external storage medium terminal.

(2) A controller 27 and an LED 28 operable upon receipt of the operating voltage from the regulator 22 through the cable 102 are added.

(3) The external interface terminal 242 of the third connector 24a is connected to the controller 27 through a cable 103-1 and the external storage medium terminal 232 of the second connector 23 is connected to the controller 27 through a cable 103-2.

On the other hand, the portable terminal 1a is different in the following point from the portable terminal 1 according to the first embodiment shown in FIG. 1.

(4) A fourth connector 13a has the charge terminal 131 and the external interface terminal 132 and not an external storage medium terminal.

With reference to FIG. 10, the controller 27 provided on the desktop holder 2a includes a portable terminal side access controller 271, a card side access controller 272, a buffer memory 273 and an LED controller 274.

The portable terminal side access controller 271 sends and receives data and a control signal to and from the controller 17 of the portable terminal 1a through the cable 103-1, the external interface terminal 242 of the third connector 24a and the external interface terminal 132 of the fourth connector 13a by a procedure according to the external interface. The portable terminal side access controller 271 then accumulates the data of the internal memory 16 received from the controller 17 into the buffer memory 273 at a time of writing into the memory card 4 and transfers the data of the memory card 4 accumulated into the buffer memory 273 to the controller 17 at a time of reading from the memory card 4.

The card side access controller 272 sends and receives data and a control signal to and from the memory card 4 through the cable 103-2 and the external storage medium terminal 232 of the second connector 23 by a procedure according to the external storage medium interface. The card side access controller 272 then writes the data of the internal memory 16 accumulated in the buffer memory 273 into the memory card 4 at a time of wiring into the memory card and accumulates the data read out from the memory card 4 into the buffer memory 273 at a time of reading from the memory card.

The portable terminal side access controller 271, the card side access controller 272 and the buffer memory 273 form an interface converting means between the external interface belonging to the portable terminal 1a and the external storage medium interface belonging to the memory card.

The LED controller 274 is a unit which turns on the LED 28 during the operation of the portable terminal side access controller 271 and the card side access controller 272. The LED 28 is attached to the side surface of the desktop holder 2a so as to be seen from the outside of the holder, so that a user can check whether the memory card 4 is being accessed or not according to the state of the LED 28 being turned on or off.

The operation in gaining access to the memory card 4 inserted in the slot 26 of the desktop holder 2a from the portable terminal 1a is the same as the operation in the first embodiment with the only difference being that the controller 27 of the desktop holder 2a performs the interface conversion as mentioned above.

According to the second embodiment, since it is not necessary to provide the fourth connector 13a of the portable terminal 1a with an external storage medium terminal, the fourth connector 13a can be reduced in size.

Although the present invention has been described with respect to the embodiments in the foregoing, it is not limited to the above embodiments only, but allows various kinds of addition and modification. For example, although one memory card slot and the second connector are provided in the desktop holder in the above-mentioned embodiments, it is also possible to arrange a plurality of different kinds of memory card slots and second connectors to cope with a plurality of kinds of memory cards.

According to the present invention, it is possible to use a memory card inserted into the slot of the desktop holder for charging a battery pack of the portable terminal as an external memory of the portable terminal and also to control access to the memory card by key operation of the portable terminal.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A desktop holder which accommodates a portable terminal, comprising:
   a first connector having a charge terminal to be connected to an output terminal of an AC adaptor which converts AC voltage of a commercial power source into charging DC voltage and outputs the obtained voltage,
   a second connector having an external storage medium terminal to be connected to an external storage medium inserted into an external storage medium slot, to enable read and write from/to said external storage medium by operation of said portable terminal,
   a third connector having a charge terminal connected to said charge terminal of said first connector and an external interface terminal connected to said external storage medium terminal of said second connector, and
   control means having an interface conversion function of connecting said external storage medium terminal of said second connector and said external interface terminal, and
   said portable terminal includes
   a fourth connector having a charge terminal and an external interface terminal to be electrically and physically connected to said third connector,
   a charging circuit which receives input of said charging DC voltage from said charge terminal of said fourth connector to charge a battery, and
   control means which controls read and write from/to the external storage medium inserted into the external storage medium slot of said desktop holder to be connected through said external storage medium terminal of said fourth connector,
   wherein said desktop holder includes a portable terminal side access controller, a card side access controller and a buffer memory, and wherein said portable terminal side access controller sends and receives data and a control signal to/from said portable terminal the external connection terminal by a procedure according to the external connection and at the time of write to said external storage medium, accumulates, in said buffer memory, data of an internal memory of said portable terminal received from said portable terminal and at the time of read from said external storage medium, transfers the data of said external storage medium accumulated in said buffer memory to said portable terminal, and said card side access controller sends and receives data and a control signal to/from said external storage medium through said external storage medium terminal by a procedure according to the external storage medium interface and at the time of write to said external storage medium, writes data of said internal memory accumulated in said buffer memory into said external storage medium and at the time of read from said external storage medium, accumulates, in said buffer memory, data read from said external storage medium.

2. The desktop holder as set forth in claim 1, wherein
said second connector is provided in said external storage medium slot provided in said case, and
said third connector is provided in a portable terminal insertion inlet provided in said case.

3. The desktop holder as set forth in claim 1, further comprising:
a regulator which receives input of said charging DC voltage from said charge terminal of said first connector and converts the voltage into operating voltage to output the obtained voltage, wherein
said second connector includes a power source terminal to which output of said regulator is applied.

4. A portable terminal system having a portable terminal and a desktop holder for the portable terminal, wherein
said desktop holder is internally provided with
a first connector having a charge terminal to be connected to an output terminal of an AC adaptor which converts AC voltage of a commercial power source into charging DC voltage and outputs the obtained voltage,
a second connector having an external storage medium terminal to be connected to an external storage medium inserted into an external storage medium slot,
a third connector having a charge terminal connected to said charge terminal of said first connector and an external interface terminal connected to said external storage medium terminal of said second connector, and
control means having an interface conversion function of connecting said external storage medium terminal of said second connector and said external interface terminal, and
said portable terminal includes
a fourth connector having a charge terminal and an external interface terminal to be electrically and physically connected to said third connector,
a charging circuit which receives input of said charging DC voltage from said charge terminal of said fourth connector to charge a battery, and
control means which controls read and write from/to the external storage medium inserted into the external storage medium slot of said desktop holder to be connected through said external storage medium terminal of said fourth connector, wherein said control means of said desktop holder includes a portable terminal side access controller, a card side access controller and a buffer memory, and wherein said portable terminal side access controller sends and receives data and a control signal to/from said control means of said portable terminal through the external interface terminal of said third connector by a procedure according to the external interface and at the time of write to said external storage medium, accumulates, in said buffer memory, data of an internal memory of said portable terminal received from said control means of said portable terminal, and at the time of read from said external storage medium, transfers the data of said external storage medium accumulated in said buffer memory to said control means of said portable terminal, and said card side access controller sends and receives data and a control signal to/from said external storage medium through said external storage medium terminal of said second connector by a procedure according to the external storage medium interface and at the time of write to said external storage medium, writes data of said internal memory accumulated in said buffer memory into said external storage medium and at the time of read from said external storage medium, accumulates, in said buffer memory, data read from said external storage medium.

5. The portable terminal system as set forth in claim 4, wherein
said second connector is provided in said external storage medium slot provided in said case of said desktop holder, and
said third connector is provided in a portable terminal insertion inlet provided in said case of said desktop holder.

6. The portable terminal system as set forth in claim 5, further comprising:
a regulator which receives input of said charging DC voltage from said charge terminal of said first connector and converts the voltage into operating voltage to output the obtained voltage, wherein
said second connector includes a power source terminal to which output of said regulator is applied.

7. The portable terminal system as set forth in claim 4, wherein
said control means of said portable terminal,
with either one of an internal memory of said portable terminal and the external storage medium inserted into said external storage medium slot set to be a transfer source memory and the other set to be a transfer destination memory, displays a list of folders of the transfer source memory on a display device of said portable terminal to select a transfer source folder by key operation and displays a list of folders of the transfer destination memory on said display device to make a user select a transfer destination folder by key operation, thereby reading data stored in said selected transfer source folder and writing the data into said selected transfer destination folder.

* * * * *